United States Patent
Gordon

(10) Patent No.: US 7,483,531 B1
(45) Date of Patent: Jan. 27, 2009

(54) TELEPHONE BILL REDUCER

(76) Inventor: Cuthbert Gordon, 117 Steam Boat Rd., Great Neck, NY (US) 11024

( * ) Notice: Subject to any disclaimer, the term of this patent is extended or adjusted under 35 U.S.C. 154(b) by 604 days.

(21) Appl. No.: 11/139,395

(22) Filed: May 26, 2005

Related U.S. Application Data

(60) Provisional application No. 60/632,071, filed on Dec. 1, 2004.

(51) Int. Cl.
*H04M 1/00* (2006.01)
*H04M 9/00* (2006.01)

(52) U.S. Cl. .............. 379/435; 379/433.01; 379/433.06

(58) Field of Classification Search ................ 379/67.1, 379/142.01, 142.02, 199, 200, 435, 433.01, 379/433.02, 433.04, 433.06, 433.07
See application file for complete search history.

(56) References Cited

U.S. PATENT DOCUMENTS

| 4,683,583 | A | | 7/1987 | Kossor |
| 4,899,372 | A | | 2/1990 | Wahi |
| 5,604,791 | A | * | 2/1997 | Lee .......................... 379/88.21 |
| 5,664,015 | A | * | 9/1997 | Ford et al. ............. 379/433.01 |
| 5,819,931 | A | | 10/1998 | Movassaghi |
| 6,212,506 | B1 | | 4/2001 | Shah |
| 6,445,793 | B1 | * | 9/2002 | Vassallo et al. ........ 379/428.01 |

* cited by examiner

*Primary Examiner*—Curtis Kuntz
*Assistant Examiner*—Tuan D Nguyen

(57) ABSTRACT

A modified phone base and handset in which an individual can limit outgoing calls and limit external access to the phone. The phone base and handset could be used in either a residential or commercial setting.

5 Claims, 2 Drawing Sheets

TELEPHONE BILL REDUCER

I. CROSS-REFERENCE TO RELATED APPLICATIONS

This application claims the benefit of U.S. Provisional Application No. 60/632,071, filed Dec. 1, 2004.

II. BACKGROUND OF THE INVENTION

The present invention concerns that of a modified phone base and handset in which an individual can limit outgoing calls and limit external access to the phone.

III. DESCRIPTION OF THE PRIOR ART

U.S. Pat. No. 4,683,583, issued to Kosser, discloses a means for protecting a telephone line by locking and blocking outgoing calls.

U.S. Pat. No. 4,899,372, issued to Wahi, discloses a telephone system allowing for the private use of extensions by providing means to block other extensions from interfering.

U.S. Pat. No. 6,212,506, issued to Shah, discloses a device allowing for the display of real time billing information while a telephone call is in progress.

IV. SUMMARY OF THE INVENTION

The present invention concerns that of a modified phone base and handset in which an individual can limit outgoing calls and limit external access to the phone. The phone base and handset could be used in either a residential or commercial setting.

There has thus been outlined, rather broadly, the more important features of a phone base and handset that can limit outgoing calls that the detailed description thereof that follows may be better understood and in order that the present contribution to the art may be better appreciated. There are, of course, additional features of the phone base and handset that can limit outgoing calls that will be described hereinafter and which will form the subject matter of the claims appended hereto.

In this respect, before explaining at least one embodiment of the phone base and handset that can limit outgoing calls in detail, it is to be understood that the phone base and handset that can limit outgoing calls is not limited in its application to the details of construction and to the arrangements of the components set forth in the following description or illustrated in the drawings. The phone base and handset that can limit outgoing calls is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present phone base and handset that can limit outgoing calls. It is important, therefore, that the claims be regarded as including such equivalent constructions insofar as they do not depart from the spirit and scope of the present invention.

It is therefore an object of the present invention to provide a phone base and handset that can limit outgoing calls which has all of the advantages of the prior art and none of the disadvantages.

It is another object of the present invention to provide a phone base and handset that can limit outgoing calls which may be easily and efficiently manufactured and marketed.

It is another object of the present invention to provide a phone base and handset that can limit outgoing calls which is of durable and reliable construction.

It is yet another object of the present invention to provide a phone base and handset that can limit outgoing calls which is economically affordable and available for relevant market segment of the purchasing public.

Other objects, features and advantages of the present invention will become more readily apparent from the following detailed description of the preferred embodiment when considered with the attached drawings and appended claims.

V. BRIEF DESCRIPTION OF THE DRAWINGS

VI. DESCRIPTION OF THE PREFERRED EMBODIMENT

Figure 1:
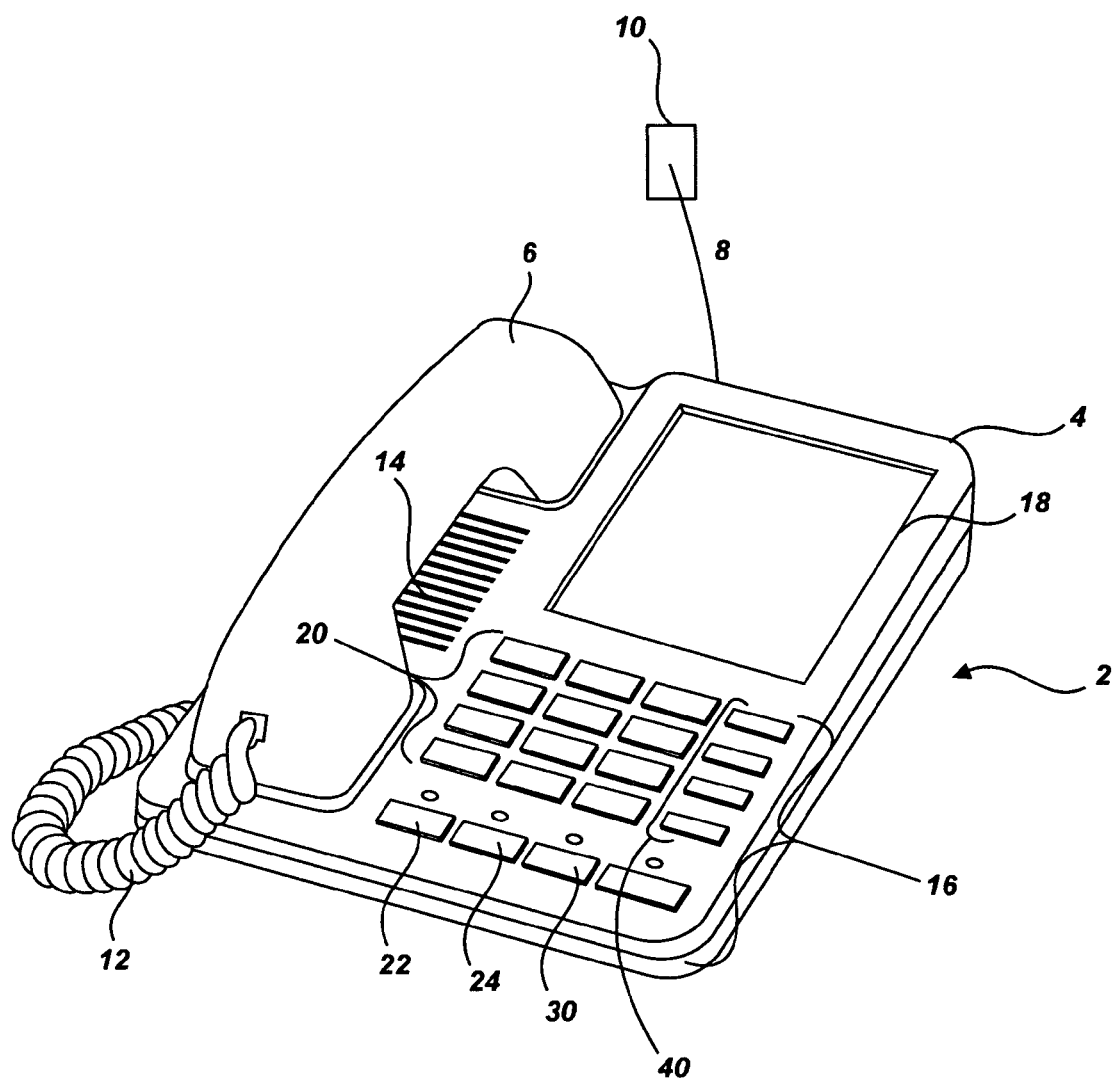
FIG. 1 shows a perspective view of the base and handset of the telephone.
Figure 2:
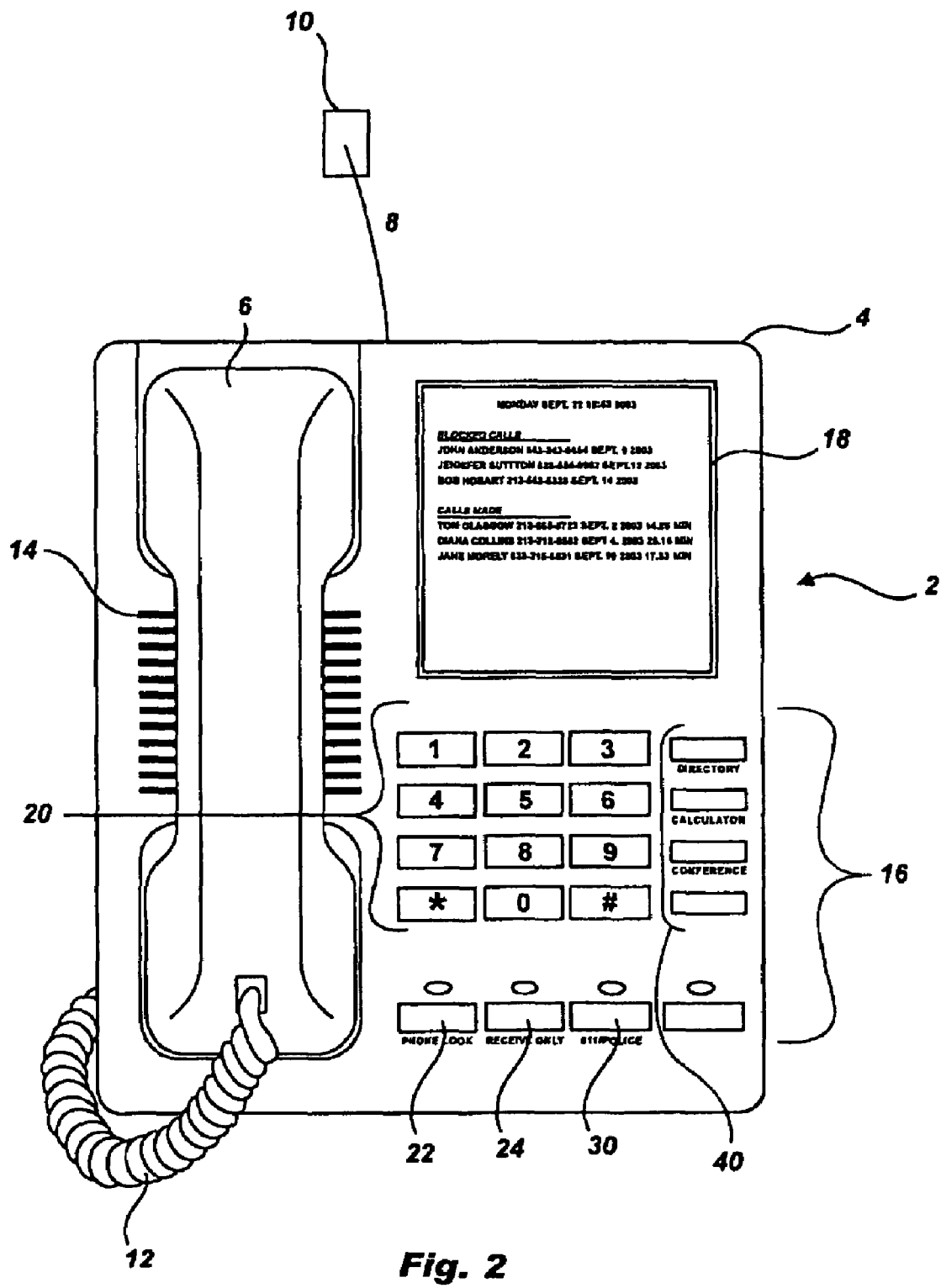
FIG. 2 shows a top view of the key pad and display screen on the base of the handset of the telephone.

FIG. 1 shows a perspective view of the base 4 and handset 6 of the telephone 2, while FIG. 2 shows a top view of the key pad 16 and display screen 18 on the base of the handset of the telephone. The telephone 2 of the present invention is designed to perform a variety of features, including allowing an individual to place the telephone into a "receive only" mode for use. Furthermore, an individual can place the telephone into a "phone lock" mode which prevents other phones on the same line from actually hearing what is actually being said by either party on the telephone 2.

Base 4 is hooked up by a connector 8 to a wall-mounted telephone jack 10 through which it has access to a telephone line. Handset 6 itself is hooked up to base 4 via a cord 12. Base 4 also has a top-mounted speaker 14, a key pad 16, and a display screen 18 for use by individuals. The display screen 18 is much larger than typically used to provide individuals with information pertaining to the use of the telephone 2. The display screen 18 is preferably a liquid crystal display screen, but can utilize other forms of technology to properly display the required information.

Key pad 16 comprises a plurality of number keys 20 and also includes a phone lock button 22. Phone lock button 22 allows an individual to prevent access to other individuals from listening in on a telephone conversation on telephone 2 through another telephone that may be hooked up to the same telephone line. This frequently happens in residential settings where multiple phones may be hooked into the same telephone line. By pushing phone lock button 22 during a telephone conversation on the telephone 2 with another user, other telephones on the same telephone line as telephone 2 are locked out and will not allow other individuals to eavesdrop.

Key pad 16 also comprises a "receive only" button 24 which can be used on the telephone 2. If the "receive only" button 24 is depressed, an individual can only receive calls on the telephone 2 and can not make any outgoing calls. This feature may be quite popular on business lines on which multiple telephones are attached. Such a feature will prevent unauthorized use of telephones, and also will prevent employees making long distance phone calls and racking up large telephone bills that any employer may have to pay.

Key pad 16 also comprises an emergency response button 30. By pushing emergency response button 30 once, 911 will be dialed. As is well known, dialing 911 usually leads to an operator and is usually only called in emergency situations. By pushing the emergency response button 30 twice within a very short period of time (usually within a second), the police instead will be called. Emergency response button gives individuals the ability to make important calls immediately without having to remember the necessary emergency numbers, which can frequently happen when individuals are placed under a great deal of stress.

Key pad 16 also includes a plurality of control buttons 40 to the right of the plurality of number keys 20, with the control buttons 40 providing such common and typical functions such as office directory, conference calling, and other widely used features.

What I claim as my invention is:

1. A communication system comprising:
   a telephone base unit,
   a telephone handset attached to the telephone base unit,
   a wall-mounted telephone jack, the telephone base unit being attached to the wall-mounted telephone jack,
   a speaker located on the telephone base unit,
   a key pad located on the telephone base unit, the key pad further comprising a plurality of number keys, the key pad further comprising a manually depressible phone lock button, wherein upon depressing of the phone lock button, the phone lock button prevents individuals from utilizing other telephones hooked up to the same telephone line as the communication system from eavesdropping, and
   a display screen located on the telephone base unit.

2. A communication system according to claim 1 wherein the key further comprises a "receive only" button, wherein depressing the "receive only" button allows an individual to only receive telephone calls on the communication system and not make any outgoing calls.

3. A communication system according to claim 1 wherein the key further comprises an emergency response button, wherein depressing the emergency response button once has the communication system call the local 911 system, further wherein depressing the emergency response button twice has the communication system call the local police.

4. A communication system according to claim 1 wherein the display screen located on the telephone base unit further comprises a liquid crystal display screen.

5. A communication system according to claim 1 wherein the key pad further comprises a plurality of control buttons.

* * * * *